July 3, 1923.

M. L. MARTIN

TRAP

Filed Oct. 18, 1922

M. L. Martin, Inventor

By C. A. Snow & Co.
Attorneys

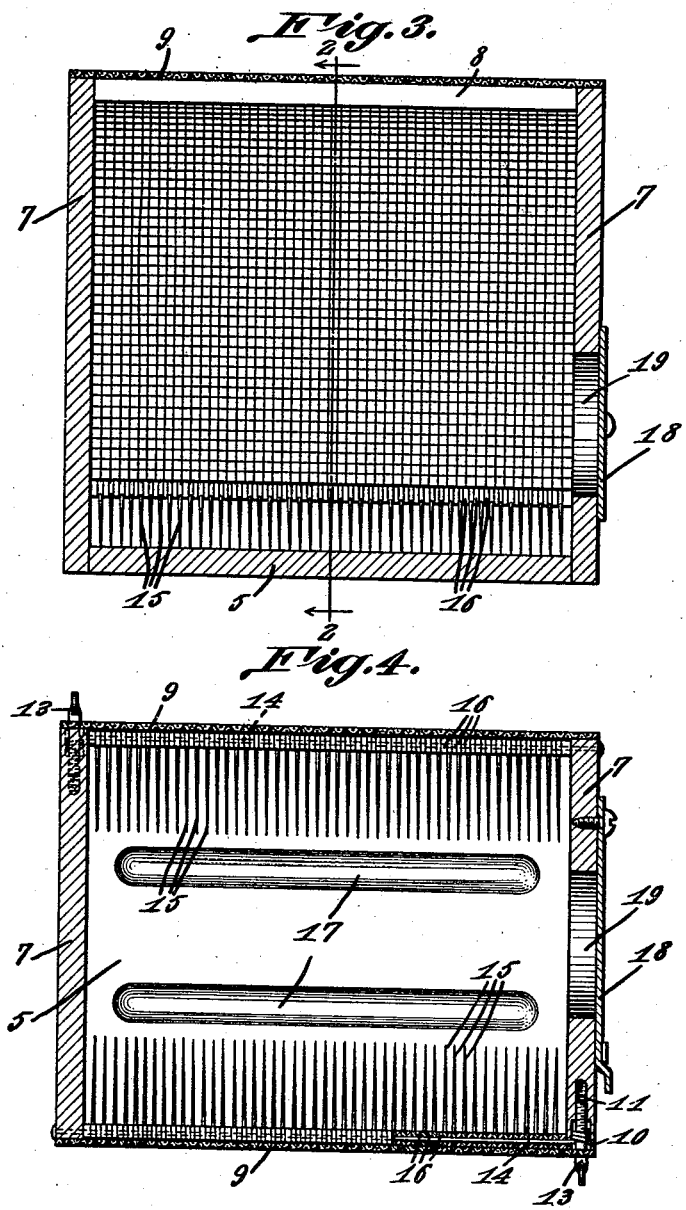

Patented July 3, 1923.

1,460,596

UNITED STATES PATENT OFFICE.

MILES L. MARTIN, OF BAINBRIDGE, GEORGIA.

TRAP.

Application filed October 18, 1922. Serial No. 595,315.

*To all whom it may concern:*

Be it known that I, MILES L. MARTIN, a citizen of the United States, residing at Bainbridge, in the county of Decatur and State of Georgia, have invented a new and useful Trap, of which the following is a specification.

This invention relates to insect traps, and more particularly to a trap especially designed for trapping insects such as roaches or the like.

The primary object of the invention is to provide a trap of this character which may be readily and easily operated by the insect passing into the trap and one which may be readily and easily emptied and cleaned.

Another object of the invention is to provide novel means for supporting and adjusting the pivoted fingers, forming a part of the trap.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is a sectional view taken on line 3—3 of Figure 1.

Figure 4 is a sectional view taken on line 4—4 of Figure 1.

Figure 1:
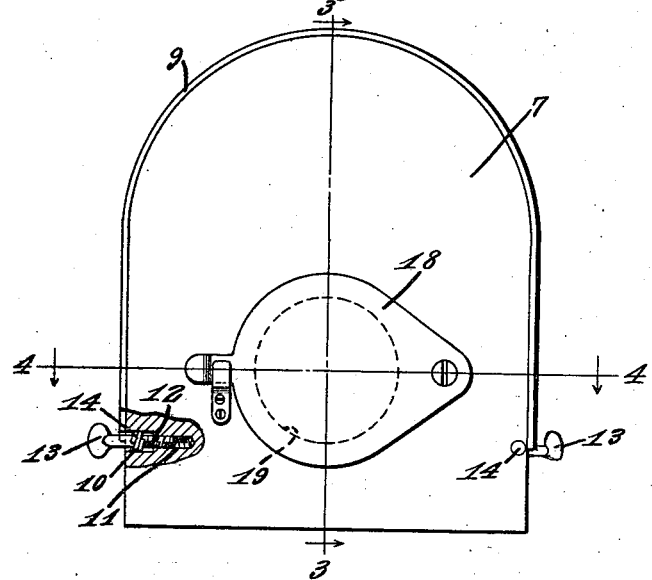
Figure 1 is a front elevational view of a trap constructed in accordance with the present invention, one portion thereof being broken away to illustrate the adjusting means.

Referring to the drawings in detail, the reference character 5 designates the base of the trap which has its upper side edges curved as at 6 to provide an easy entrance to the trap.

The end sections are indicated at 7 and are connected at their upper ends by means of the bar 8 which also provides a support for the body portion of the trap 9 that includes a length of wire mesh material, the ends thereof being disposed in spaced relation with the edges of the base 5 to provide openings for the admission of insects to the trap. Each end section is provided with a cut out portion 10 having a reduced threaded portion 11 adapted to accommodate the threaded portion 12 of the adjusting screw 13 associated therewith.

Disposed adjacent to the lower edges of the wire mesh material or body portion 9, are the wires 14 that have one of their respective ends secured to one of the end sections, the opposite ends thereof being secured to the adjusting screws 13 associated therewith so that when the adjusting screws are rotated, the wires connected therewith may be stretched or loosened at the will of the operator.

Figure 2:
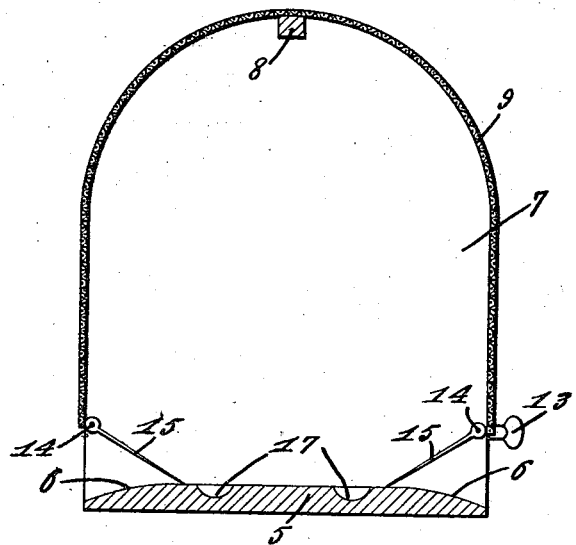
Figure 2 is a sectional view taken on line 2—2 of Figure 3.

Supported by the wires are a plurality of fingers 15 which have their inner ends pointed to lie in close engagement with the base 5 as clearly shown by Figure 2 of the drawings, the fingers being of sufficient lengths to extend an appreciable distance within the trap proper, where the same are disposed at angles.

Spacing members 16 which are in the form of washers, are positioned between adjacent fingers to hold the fingers in proper spaced relation with each other on their supporting wires.

Formed in the upper surface of the base 5 are grooves 17 that are designed to receive a suitable bait for attracting the insects to the interior of the trap, the locations of the grooves, with respect to the inner ends of the fingers 15, being such as to insure the insect passing into the trap before the insect may have access to the bait.

In order that the bait may be positioned within the trap, a pivoted closure 18 is provided, which closure is designed to close the opening 19 formed in one of the end sections of the trap.

From the foregoing it will be seen that as a roach passes under the fingers 15 and enters the trap, the fingers will fall by gravity to the positions as shown by figure 2 of the drawings, to the end that if the roach attempts to pass from the trap, it will be guided upwardly over the fingers.

What is claimed as new is:—

1. In a trap, a base, end sections secured to the base, a body portion formed of wire mesh material supported by the end sections, the edges of the wire mesh material being disposed in spaced relation with the base to provide entrance openings, an adjustable wire supported adjacent to the lower edges of the wire mesh material, and pivoted fingers supported by the adjustable wire to normally close the entrance openings.

2. In a trap, a base, end sections secured to the base, a body portion supported by the end sections, the lower ends of the body portion being disposed in spaced relation with the base to provide entrance openings, a wire disposed adjacent to each lower end of the body portion, an adjusting screw having connection with each wire, pivoted fingers supported on the wire and having their inner ends normally contacting with the base to close the entrance opening, and said adjusting screws adapted to be operated to stretch the wires.

In testimony that I claim the foregoing as my own, I have hereto affixed my signature in the presence of two witnesses.

MILES L. MARTIN.

Witnesses:
ALBERT E. THORNTON,
CLIFF B. BRACKETT.